United States Patent
Reis et al.

Patent Number: 5,879,492
Date of Patent: Mar. 9, 1999

[54] Z-PEEL SHEETS

[75] Inventors: Carl Andrew Reis, Torrance; Benjamin S. Wong, Diamond Bar, both of Calif.

[73] Assignee: Northrop Grumman Corporation, Los Angeles, Calif.

[21] Appl. No.: 62,544

[22] Filed: Apr. 17, 1998

[51] Int. Cl.⁶ ........................................................ B32B 5/00
[52] U.S. Cl. ............................. 156/72; 156/230; 156/247
[58] Field of Search ................................ 156/72, 230, 247

[56] References Cited

U.S. PATENT DOCUMENTS 4,888,228  12/1989  Sidles .......................................... 428/86

Primary Examiner—Christopher Raimund
Attorney, Agent, or Firm—Terry J. Anderson; Karl J. Hoch, Jr.

[57] ABSTRACT

In accordance with the present invention, there is provided a method of increasing the surface bond strength characteristics of a resin composite material. The method begins with providing a peel-ply sheet which defines opposed planar faces. A multitude of elongate bond fibers are embedded into the peel-ply sheet in a manner in which a majority of the bond fibers do not extend in co-planar relation to the planar faces of the peel-ply sheet. A resin composite material is provided. The peel-ply sheet is applied to the resin composite material such that the bond fibers are partially embedded therein. The resin composite material is cured. The peel-ply sheet is removed from the cured resin composite material such that the bond fibers remain implanted therein.

23 Claims, 4 Drawing Sheets

Z-PEEL SHEETS

FIELD OF THE INVENTION

The present invention relates generally to methods of improving composite surface bonding characteristics, and more particularly to methods of improving composite surface bonding characteristics through the application of a fiber embedded peel-ply sheets.

BACKGROUND OF THE INVENTION

In modern aircraft, the surface skins commonly take the form of composite laminates. Such composite materials comprise fibers embedded or impregnated in a resin matrix. The fibers are typically formed from carbon or glass. Often, it is necessary to attach to aircraft skins various components such as internal structural supports (i.e., stiffeners). In the case of a damaged aircraft skin section, repairs can take the form of attachment of a repair patch to the skin. In these and other instances adhesive bonding is usually desirable. The strength of the adhesive bond to composite materials is a function of the surface characteristics.

Commonly, the surface of composite materials has a glossy surface resin layer. This relatively smooth, mirror-like layer of resin is formed from excess resin which tends to flow and pool at the surface of the resin matrix once the embedded fibers are saturated during the curing process. Because the adhesive or bonding strength is a function of surface area, such a glossy surface exhibits a relatively low bonding strength.

As a result, there has been industry drive to develop low cost methods to increase the surface area of composite materials. One such development in the art is the use of peel-ply sheets during the manufacture of resin composite structures. A conventional peel-ply sheet consists of a sheet of woven material. The woven material is placed on the uncured resin surface of composite structures. The resin is allowed to saturate the peel-ply material. Subsequently, the resin composite with the applied peel-ply material is allowed to cure. Once the resin hardens, the peel-ply material is removed or peeled away from the resin composite. As a result, the surface of the resin composite is imprinted with texture characteristics similar to the peel-ply material. Accordingly, the surface area of the resin composite is increased. The textured surface of the resin, though being irregular, however, remains relatively smooth on a micro-level.

As such, whether or not a peel-ply procedure is utilized, further surface preparation techniques have been developed to increase the surface area of cured resin composites. A common technique is to perform manual sanding of the surface of the resin composite. As a result of sanding, the surface becomes roughened and the surface area is accordingly increased. Such an additional process, however, is labor intensive and therefore is relatively expensive.

Sand blasting or similar pressurized surface abrasion techniques are a more drastic approach to increasing resin composite surface area. While such procedures are effective in rapidly roughening the resin composite surface, controlling the degree of abrasion is difficult. Over processing the surface can result in damage to the resin composite structure. This occurs at areas where the surface resin is entirely removed and underlying composite fibers become exposed. Exposure of composite fibers results in the weakening of the structural integrity of the composite and is therefore highly undesirable. In addition, over processing can result in a polishing of the subject surface with a corresponding decrease of the surface area.

Moreover, with regard to surfacing processes, such as sanding, such processes only affect localized portions of the resin surface where a peel-ply application is utilized. Equating the textured surface to a series of mountains and valleys, sanding only effects the uppermost portions of the mountains. Thus, the surface at the lower portions of the mountains and the valleys would be unaffected by the sanding procedure. Thus, these unaffected regions would retain their glossy nature and would continue to exhibit relatively poor bonding characteristics.

It is therefore evident that there exists a need in the art for a low cost method of increasing the surface area of resin composites to improve surface bonding characteristics.

SUMMARY OF THE INVENTION

In accordance with the present invention, there is provided a method of increasing the surface bond strength characteristics of a resin composite material. The method begins with providing a peel-ply sheet which defines opposed planar faces. A multitude of elongate bond fibers are embedded into the peel-ply sheet in a manner in which a majority of the bond fibers do not extend in co-planar relation to the planar faces of the peel-ply sheet. A resin composite material is provided. The peel-ply sheet is applied to the resin composite material such that the bond fibers are partially embedded therein. The resin composite material is cured. The peel-ply sheet is removed from the cured resin composite material such that the bond fibers remain implanted therein.

The planar faces of the peel-ply sheet may be defined by an X-Y plane. The bond fibers are initially embedded in the peel-ply sheet such that the fibers are oriented to have a Z-axis component with resect to the planar faces of the peel-ply sheet. When the bond fiber embedded peel-ply sheet is applied to the uncured resin composite material, the bond fibers are partially embedded in and partially extending from the resin composite material. As a result, the cured resin composite material has an increased effective surface area which includes the surface areas of the exposed portions of the implanted bond fibers. Thus, a significant increase in adhesive bonding strength of the resin composite material is realized.

It is contemplated that the peel-ply material may be in the form of a fabric, which is woven or matted. A polymer material is preferably used. The material selection of the peel-ply sheet material is subject to being able to withstand the curing temperatures of the resin composite material to which it is applied. Thus, it is desirable that the peel-ply sheet material be heat resistant. In addition, the peel-ply sheet is preferably coated with a release agent to facilitate removal and separation of the peel-ply sheet from the bond fibers and the cured resin composite material. With respect to the bond fibers, a carbon material or graphite material may be used.

In the preferred embodiment of the present invention, the bond fibers are embedded into the peel-ply sheet through the use of a flocking process. The flocking process may be mechanical or electro-static in nature. The flocking process includes shooting the bond fibers at the peel-ply sheet with sufficient force to embed the bond fibers into the peel-ply sheet. The bond fibers are shot from a bond fiber source through a screen, with a portion of the bond fibers passing through the screen and becoming embedded in the peel-ply sheet. The bond fibers after having passed through the screen are imbedded in the peel-ply sheet in a series of bushels. The bond fibers of each bushel extending in multiple directions relative to the planar faces of the peel-ply sheet.

In addition, the present invention includes the fiber embedded peel-ply sheets constructed in accordance with the above described methods.

In another embodiment of the present invention, there is provided a method of increasing the surface bond strength characteristics of a resin composite material. The method begins with providing a peel-ply sheet formed of intermeshed transfer fibers and bond fibers. Preferably the transfer fibers to have a relatively higher tensile strength than the bond fibers and transfer fibers and bond fibers are woven together. A resin composite material is provided. The peel-ply sheet is applied to the resin composite material such that the bond fibers are partially embedded therein. The resin composite material is cured.

The peel-ply sheet is removed from the cured resin composite material such that the transfer fibers are separated from the resin composite material and the bond fibers are fractured so as to form bond fiber fragments. As a result the bond fiber fragments are partially embedded in and protrude from the cured resin composite material.

It is contemplated that the transfer fibers may be a polymer material and is heat resistant to withstand the curing temperatures of the resin composite material to which it is applied. In addition, the transfer fibers are preferably coated with a release agent to facilitate removal and separation from the bond fibers and the cured resin composite material. With respect to the bond fibers, a carbon material or graphite material may be used.

In addition, the present invention includes the resin composite materials which have been implanted with the bond fibers or bond fragments in accordance with the above described methods.

As such, based on the foregoing, the present invention mitigates the inefficiencies and limitations associated with prior art methods to increase the surface area of resin composite materials and structures.

In comparison to using conventional peel-ply sheets, the bond fibers utilized in the present invention significantly increase the surface area. A significant increase in adhesive bonding strength is thus realized. Significantly, the present invention avoids the potential for damaging the subject composite material as is the case with over-sanding during abrasive surface processes.

In addition, where separate resin composite structures are formed using peel sheets of the present invention, it is contemplated that the impregnated bond fibers of the respective composites structures would interlock during bonding of the structures. Such interlocking further increases the adhesive bonding strength.

It is contemplated that the peel-ply sheets of the present invention would be especially efficient in the resin composite fabrication shop environment. A composite fabrication worker need only have a roll of the peel-ply sheets available for use. Flocking equipment or other similar devices for implanting the bonding fibers need not be purchased by the composite manufacturer. The composite manufacturer would simply purchase a roll or rolls of the bond fiber impregnated peel-ply sheets, just as would be customarily done with any conventional peel-ply sheets. Thus, no specialized tooling need be purchased by the manufacturer of the composite material in order to practice the present invention.

Advantageously, in terms of labor costs, in order to practice the present invention, the composite fabrication worker needs only to spend a comparable amount of time applying and removing the bond fiber impregnated peel-ply sheets as would be needed with regard to use of conventional peel-ply sheets.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
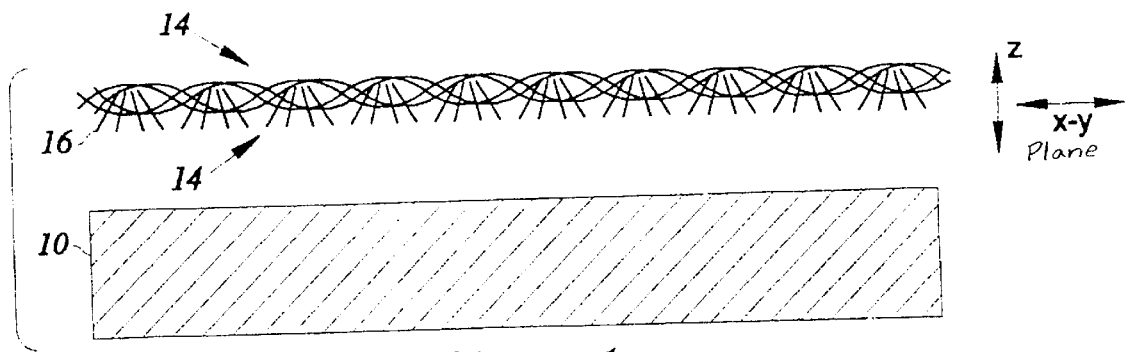
FIG. 1 is a cross-sectional view of the peel sheet of the present invention shown in relation to a resin composite material.

Referring now to the drawings wherein the showings are for purposes of illustrating a preferred embodiment of the present invention only, and not for purposes of limiting the same, FIGS. 1–12 illustrate a peel sheet and a resin composite material which are constructed in accordance with the present invention. As will be described in more detail below, the peel sheet is used to implant bond fibers into uncured resin composite materials to significantly increase the surface area surface bond strength of the resin composite material.

Figure 2:
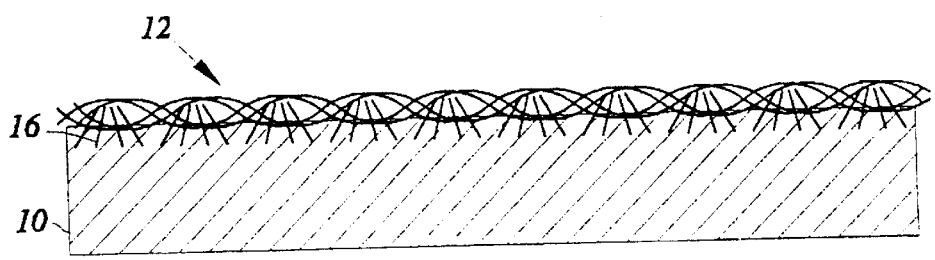
FIG. 2 is the peel sheet of FIG. 1 as applied to the resin composite material.
Figure 3:
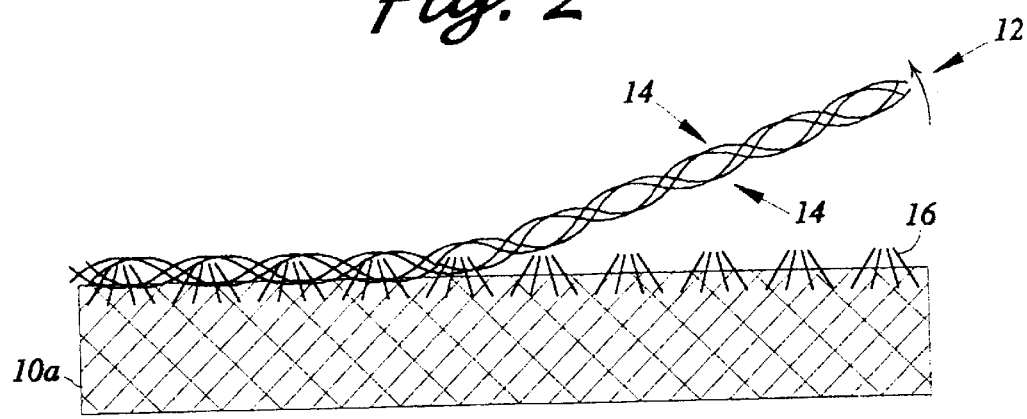
FIG. 3 depicts the peel sheet of FIG. 2 being removed from the cured resin composite material.
Figure 4:
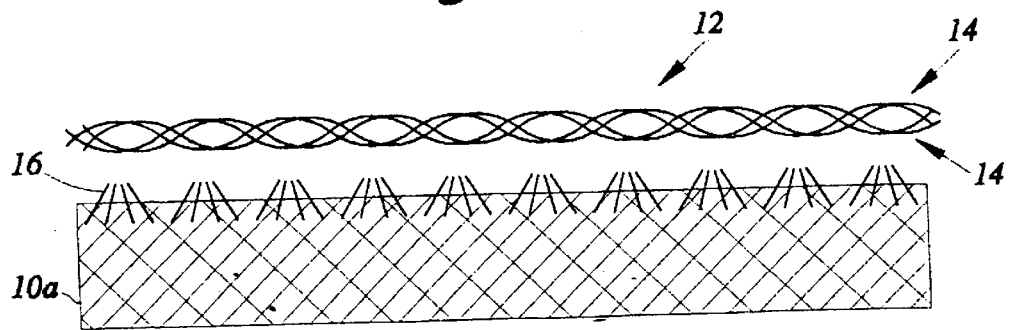
FIG. 4 depicts the cured resin composite material of FIG. 3 after the peel sheet is removed.

Referring now to FIG. 1, in accordance with the present invention, there is provided a method of increasing the surface area of a resin composite material 10. The method begins with providing a peel-ply sheet 12 which defines opposed planar faces 14. A multitude of elongate bond fibers 16 are embedded into the peel-ply sheet 12 in a manner in which a majority of the bond fibers 16 do not extend in co-planar relation to the planar faces 14 of the peel-ply sheet 12. A resin composite material 10 is provided. Referring now to FIG. 2, the peel-ply sheet 12 is applied to the resin composite material 10 such that the bond fibers 16 are partially embedded therein. The resin composite material 10 is cured as depicted in FIG. 3. The peel-ply sheet 12 is removed from the cured resin composite material 10a such that the bond fibers 16 remain implanted therein.

The planar faces 14 of the peel-ply sheet 12 may be defined by an X-Y plane. The bond fibers 16 are initially embedded in the peel-ply sheet 12 such that the fibers 16 are oriented to have a Z-axis component with resect to the planar faces 14 of the peel-ply sheet 12. When the bond fiber embedded peel-ply sheet 12 is applied to the uncured resin composite material 10, the bond fibers 16 are partially embedded in and partially extending from the resin composite material 10. As a result, the cured resin composite material 10a has an increased effective surface area which includes the surface areas of the exposed portions of the implanted bond fibers 16. Thus, a significant increase in adhesive bonding strength of the resin composite material 10a is realized.

It is contemplated that the peel-ply material 12 may be in the form of a fabric, which is woven, felted or matted, for example. One of ordinary skill in the art will recognize that other suitable fabric types may be utilized. A polymer material is preferably used. The material selection of the peel-ply sheet 12 is subject to being able to withstand the curing temperatures of the resin composite material 10 to which it is applied. Thus, it is desirable that the peel-ply sheet material be heat resistant. It is contemplated that the selected material and sizing and configuration of such material used for the peel-ply sheet 12 is chosen from those well known to one of ordinary skill in the art. It is contemplated that the sheet 12 may be an elastomeric material such as rubber. In such a case, the bond fiber 16 would be implanted into the rubber and the implated portion would be sealed so as to resist an wicking effect of the resin on which the sheet 12 is to be applied. In this regard, in another embodiment of the present invention, the peel-ply sheet 12 is preferably coated with a release agent to facilitate removal and separation of the peel-ply sheet 12 from the bond fibers 16 and the cured resin composite material 10a. With respect to the bond fibers 16, a carbon, graphite, glass, boron materials may be used and one of ordinary skill in the art will recognize that other suitable materials may be substituted.

Figure 5:
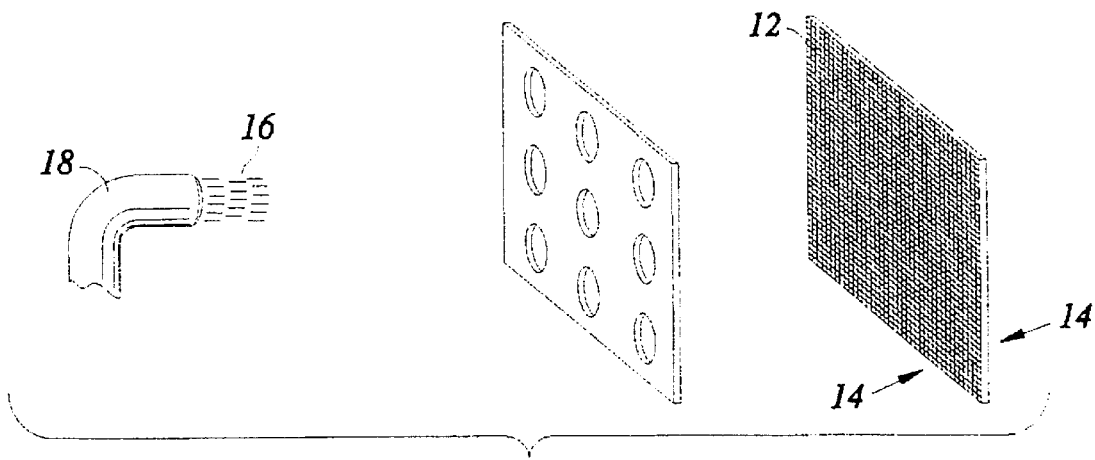
FIG. 5 depicts a bond fiber source from which bond fibers are shot through a screen and into a peel sheet.
Figure 6:
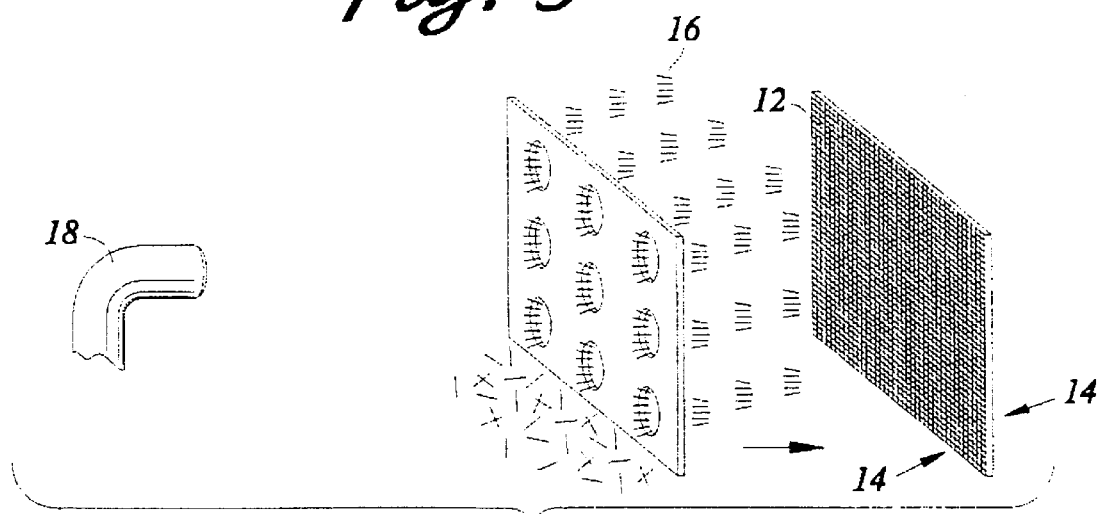
FIG. 6 depicts the bond fibers of FIG. 5 as they pass through the screen.
Figure 7:
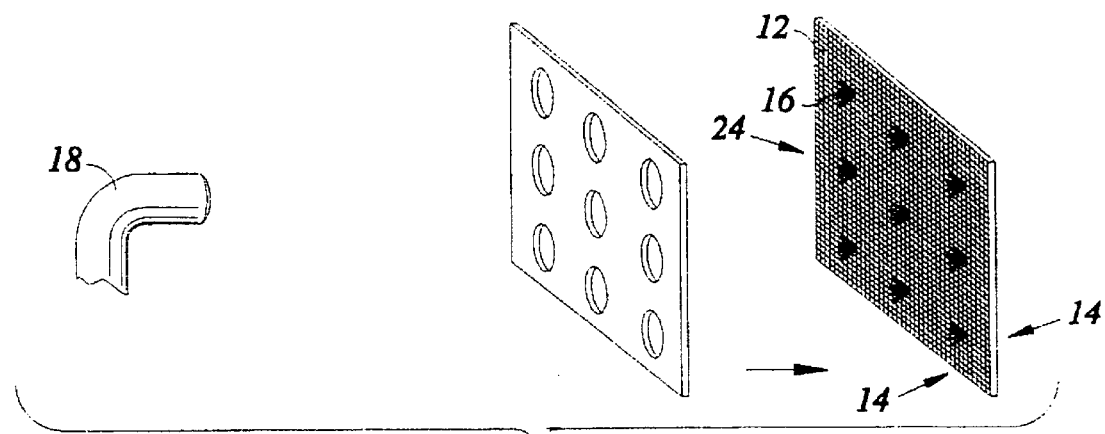
FIG. 7 depicts the bond fibers of FIG. 6 after have been embedded in the peel sheet.
Figure 8:
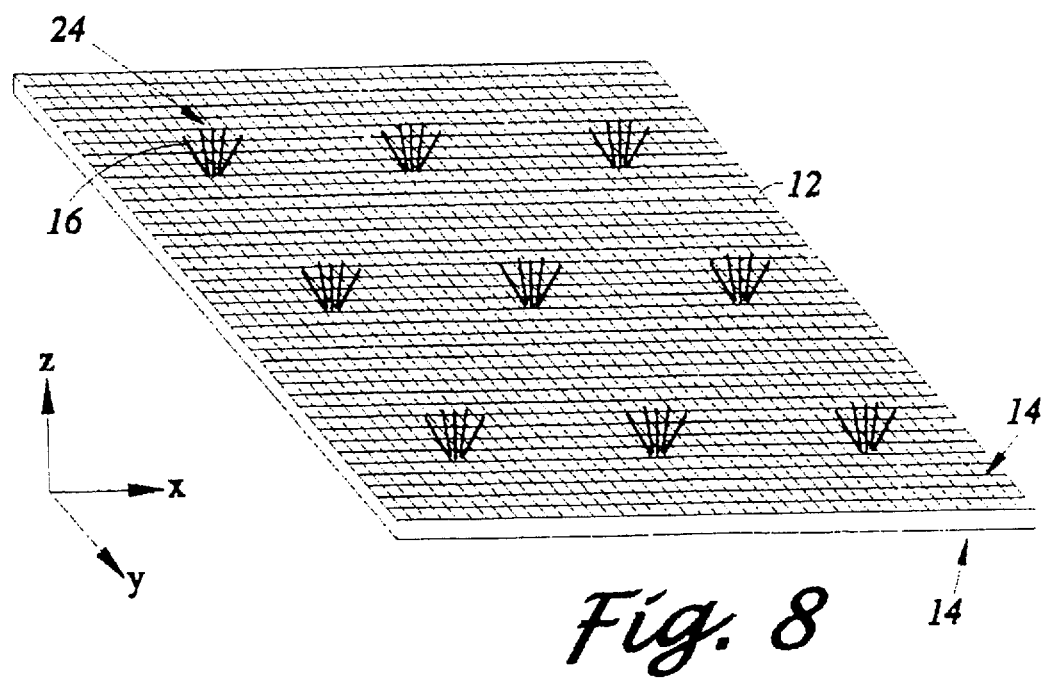
FIG. 8 is a perspective view of a peel sheet constructed in accordance with the present invention.
Figure 9:
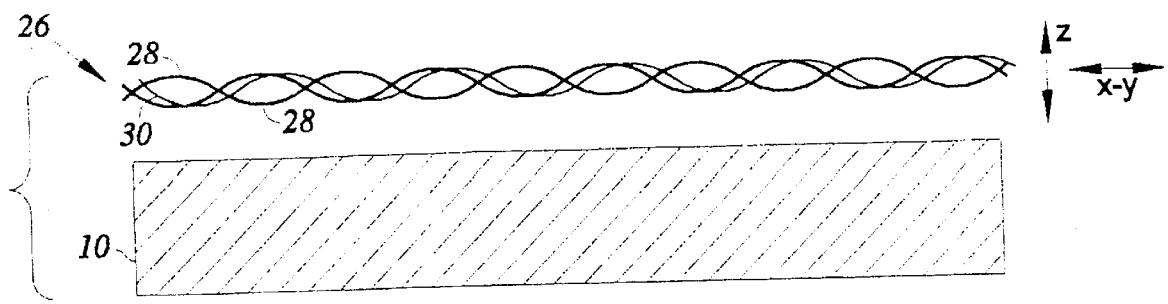
FIG. 9 is a cross-sectional view of the peel sheet of another embodiment of the present invention shown in relation to a resin composite material.
Figure 10:
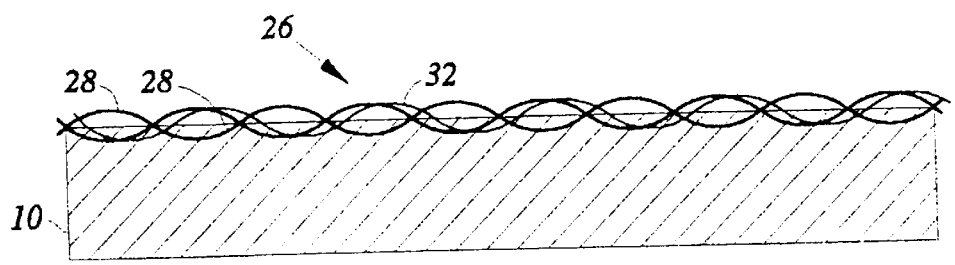
FIG. 10 is the peel sheet of FIG. 9 as applied to the resin composite material.
Figure 11:
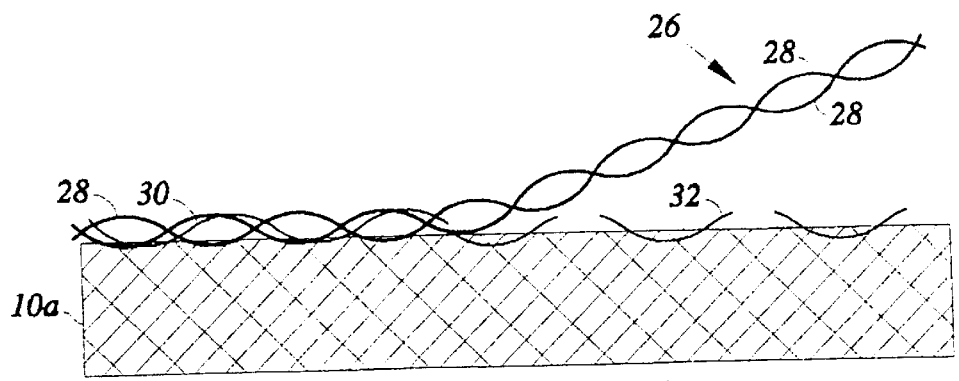
FIG. 11 depicts the transfer fibers of the peel sheet of FIG. 10 being removed from the cured resin composite material.
Figure 12:
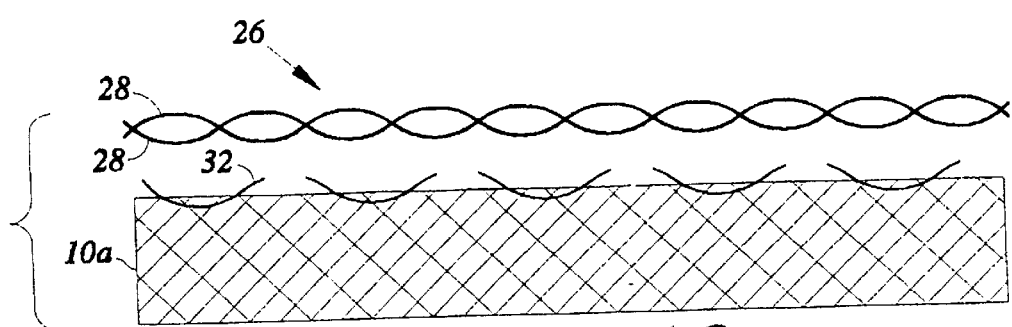
FIG. 12 depicts the cured resin composite material of FIG. 11 after the transfer fibers are removed.

Referring now to FIGS. 5–7, in the preferred embodiment of the present invention, the bond fibers 16 are embedded into the peel-ply sheet 12 through the use of a flocking process. The flocking process may be mechanical or electrostatic in nature. The flocking process includes shooting the bond fibers 16 at the peel-ply sheet 12 with sufficient force to embed the bond fibers 16 into the peel-ply sheet 12. The bond fibers 16 are shot from a bond fiber source 18 through a screen 20, with a portion of the bond fibers 16 passing through the screen 18 and becoming embedded in the peel-ply sheet 12. Preferably, the screen 20 is provided with a plurality of holes 22. The bond fibers 16 after having passed through the holes 22 of the screen 20 are imbedded in the peel-ply sheet in a series of bushels 24 to form a fiber embedded peel-ply sheet 26, as shown in FIGS. 7 and 8. The bond fibers 16 of each bushel 24 extending in multiple directions relative to the planar faces 14 of the peel-ply sheet 12. It is contemplated that by passing the bond fiber 16 through the screen 20 so as to result in the formation of the bushels 24, the degree of implantation into the peel-ply sheet 12 can be controlled. Thus, in the absence of the screen 24, the bond fibers 16 are implanted at greater distance into and/or through the peel-ply sheet 12.

In addition, the present invention includes the fiber embedded peel-ply sheets 26 constructed in accordance with the above described methods.

Referring now to FIGS. 9–12, in another embodiment of the present invention, there is provided a method of increasing the surface area and surface bond strength characteristics of a resin composite material. The method begins with providing a peel-ply sheet 26 formed of intermeshed transfer fibers 28 and bond fibers 30. Preferably the transfer fibers 28 to have a relatively higher tensile strength than the bond fibers 30, and transfer fibers 28 and bond fibers 30 are woven together. A resin composite material 10 is provided. The peel-ply sheet 26 is applied to the resin composite material 10 such that the bond fibers 30 are partially embedded therein. The resin composite material 10 is cured. The peel-ply sheet 26 is removed from the cured resin composite material 10a such that the transfer fibers 28 are separated from the cured resin composite material 10a and bond fibers 30 are fractured so as to form bond fiber fragments 32. The bond fiber fragments 32 are partially embedded in and protrude from the cured resin composite material 10a.

It is contemplated that the transfer fibers 28 may be a polymer material and is heat resistant to withstand the curing temperatures of the resin composite material 10 to which it is applied. In addition, the transfer fibers 28 are preferably coated with a release agent to facilitate removal and separation from the bond fibers 30 and the cured resin composite material 10a. With respect to the bond fibers 30, a carbon material or graphite material may be used.

In addition, the present invention includes the resin composite materials which have been implanted with the bond fibers 16 or bond fragments 32 in accordance with the above described methods.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A method of increasing the surface area of a resin composite material, the method comprising the steps of:
    (a) providing a peel-ply sheet which defines opposed planar faces;
    (b) embedding a multitude of elongate bond fibers into the peel-ply sheet in a manner wherein a majority of the bond fibers do not extend in co-planar relation to the planar faces of the peel-ply sheet;
    (c) providing a resin composite material;
    (d) applying the peel-ply sheet to the resin composite material such that the bond fibers are partially embedded therein;
    (e) curing the resin composite material; and
    (f) removing the peel-ply sheet from the cured resin composite material such that the bond fibers remain implanted therein.

2. The cured composite material formed in accordance with the method of claim 1.

3. The method of claim 1 wherein step (a) comprises forming the peel-ply sheet from an polymer material.

4. The method of claim 1 wherein step (a) comprises forming the peel-ply sheet from a fabric material.

5. The method of claim 1 wherein step (a) comprises forming the peel-ply sheet from a heat resistant material.

6. The method of claim 1 wherein step (a) comprises forming the peel-ply sheet from a resin material.

7. The method of claim 1 wherein step (a) comprises coating the peel-ply sheet with a release agent.

8. The method of claim 1 wherein step (b) comprises embedding the bond fibers into the peel-ply sheet through the use of a flocking process.

9. The method of claim 8 wherein step (b) comprises using a mechanical flocking process.

10. The method of claim 8 wherein step (b) comprises using an electro-static flocking process.

11. The method of claim 8 wherein the flocking process comprises shooting the bond fibers at the peel-ply sheet with sufficient force to embed the bond fibers into the peel-ply sheet.

12. The method of claim 11 wherein the bond fibers are shot from a bond fiber source through a screen, with a portion of the bond fibers passing through the screen and becoming embedded in the peel-ply sheet.

13. The method of claim 12 wherein the bond fibers passing through the screen are imbedded in the peel-ply sheet in a series of bushels, the bond fibers of each bushel extending in multiple directions relative to the planar faces of the peel-ply sheet.

14. The method of claim 1 wherein step (b) comprises forming the bond fibers from a carbon material.

15. The method of claim 1 wherein step (b) comprises forming the bond fibers from a graphite material.

16. A method of increasing the surface area and surface bond strength characteristics of a resin composite material, the method comprising the steps of:

(a) providing a peel-ply sheet formed of intermeshed transfer fibers and bond fibers;

(c) providing a resin composite material;

(d) applying the peel-ply sheet to the resin composite material such that the bond fibers are partially embedded therein;

(e) curing the resin composite material; and (f) removing the peel-ply sheet from the cured resin composite material such that the transfer fibers are separated from the resin composite material and the bond fibers are fractured so as to form bond fiber fragments which are partially embedded in and protrude from the cured resin composite material.

17. The method of claim 16 wherein step (a) comprises forming the transfer fibers to have a relatively higher tensile strength than the bond fibers.

18. The method of claim 16 wherein step (a) comprises weaving the transfer fibers and bond fibers together.

19. The method of claim 16 wherein step (a) comprises forming the transfer fibers from a polymer material.

20. The method of claim 16 wherein step (a) comprises forming the transfer fibers from a heat resistant material.

21. The method of claim 16 wherein step (a) further comprises coating the transfer fibers with a release agent.

22. The method of claim 16 wherein step (a) comprises forming the bond fibers from a carbon material.

23. The method of claim 16 wherein step (a) comprises forming the bond fibers from a graphite material.

* * * * *